(12) United States Patent
Lai et al.

(10) Patent No.: US 12,266,157 B2
(45) Date of Patent: Apr. 1, 2025

(54) TEMPORAL AUGMENTATION FOR TRAINING VIDEO REASONING SYSTEM

(71) Applicant: NEC Laboratories America, Inc., Princeton, NJ (US)

(72) Inventors: Farley Lai, Santa Clara, CA (US); Asim Kadav, Mountain View, CA (US)

(73) Assignee: NEC Corporation, Tokyo (JP)

( * ) Notice: Subject to any disclaimer, the term of this patent is extended or adjusted under 35 U.S.C. 154(b) by 376 days.

(21) Appl. No.: 17/712,617

(22) Filed: Apr. 4, 2022

(65) Prior Publication Data

US 2022/0319157 A1 Oct. 6, 2022

Related U.S. Application Data

(60) Provisional application No. 63/171,215, filed on Apr. 6, 2021.

(51) Int. Cl.
*G06V 10/774* (2022.01)
*G06V 10/62* (2022.01)
*G06V 10/764* (2022.01)

(52) U.S. Cl.
CPC .......... *G06V 10/7747* (2022.01); *G06V 10/62* (2022.01); *G06V 10/764* (2022.01)

(58) Field of Classification Search
None
See application file for complete search history.

(56) References Cited

U.S. PATENT DOCUMENTS

| 2010/0067865 A1 | 3/2010 | Saxena et al. |
| 2020/0242425 A1* | 7/2020 | Yamada ................. G06V 10/10 |
| 2022/0303560 A1* | 9/2022 | Sridhar .................. G06N 3/082 |

OTHER PUBLICATIONS

D. Wei, J. Lim, A. Zisserman and W. T. Freeman, "Learning and Using the Arrow of Time," 2018 IEEE/CVF Conference on Computer Vision and Pattern Recognition, Salt Lake City, UT, USA, 2018, pp. 8052-8060, doi: 10.1109/CVPR.2018.00840. (Year: 2018).*
W. Li, W. Nie and Y. Su, "Human Action Recognition Based on Selected Spatio-Temporal Features via Bidirectional LSTM," in IEEE Access, vol. 6, pp. 44211-44220, 2018, doi: 10.1109/ACCESS. 2018.2863943 (Year: 2018).*

(Continued)

*Primary Examiner* — Mark R Milia
(74) *Attorney, Agent, or Firm* — Joseph Kolodka

(57) ABSTRACT

A method for augmenting video sequences in a video reasoning system is presented. The method includes randomly subsampling a sequence of video frames captured from one or more video cameras, randomly reversing the subsampled sequence of video frames to define a plurality of sub-sequences of randomly reversed video frames, training, in a training mode, a video reasoning model with temporally augmented input, including the plurality of sub-sequences of randomly reversed video frames, to make predictions over temporally augmented target classes, updating parameters of the video reasoning model by a machine leaning algorithm, and deploying, in an inference mode, the video reasoning model in the video reasoning system to make a final prediction related to a human action in the sequence of video frames.

20 Claims, 7 Drawing Sheets

(56) References Cited

OTHER PUBLICATIONS

B. Fernando, H. Bilen, E. Gavves and S. Gould, "Self-Supervised Video Representation Learning with Odd-One-Out Networks," 2017 IEEE Conference on Computer Vision and Pattern Recognition (CVPR), Honolulu, HI, USA, 2017, pp. 5729-5738, doi: 10.1109/CVPR.2017.607. (Year: 2017).*

Xu et al., Quadratic Video Interpolation, 33rd Conference on Neural Information Processing Systems (NeurIPS 2019), Vancouver, Canada. (Year: 2019).*

Dwibedi et al., Counting OUt Time: Class Agnostic Video Repetition Counting in the Wild, 2020 (Year: 2020).*

Falcon, Alex, Oswald Lanz, and Giuseppe Serra. "Data augmentation techniques for the Video Question Answering task." In European Conference on Computer Vision, pp. 511-525. Springer, Cham, 2020.

Wang, Jason, and Luis Perez. "The effectiveness of data augmentation in image classification using deep learning." Convolutional Neural Networks Vis. Recognit 11 (2017): 1-8.

\* cited by examiner

TEMPORAL AUGMENTATION FOR TRAINING VIDEO REASONING SYSTEM

RELATED APPLICATION INFORMATION

This application claims priority to Provisional Application No. 63/171,215, filed on Apr. 6, 2021, the contents of which are incorporated herein by reference in their entirety.

BACKGROUND

Technical Field

The present invention relates to data augmentation techniques and, more particularly, to temporal augmentation for training a video reasoning system.

Description of the Related Art

The recent advances in deep learning and deep learning models have been largely connected to the quantity and diversity of data gathered. Data augmentation enables practitioners to significantly increase the diversity of data available for training the models without actually collecting new data. Data augmentation is a technique that helps to create new training data from the existing training data artificially. This is done by applying specific techniques to training data to generate new and different training examples. The most commonly used data augmentation techniques to train large neural networks are cropping, padding, and horizontal flipping.

SUMMARY

A method for augmenting video sequences in a video reasoning system is presented. The method includes randomly subsampling a sequence of video frames captured from one or more video cameras, randomly reversing the subsampled sequence of video frames to define a plurality of sub-sequences of randomly reversed video frames, training, in a training mode, a video reasoning model with temporally augmented input, including the plurality of sub-sequences of randomly reversed video frames, to make predictions over temporally augmented target classes, updating parameters of the video reasoning model by a machine leaning algorithm, and deploying, in an inference mode, the video reasoning model in the video reasoning system to make a final prediction related to a human action in the sequence of video frames.

A non-transitory computer-readable storage medium comprising a computer-readable program for augmenting video sequences in a video reasoning system is presented. The computer-readable program when executed on a computer causes the computer to perform the steps of randomly subsampling a sequence of video frames captured from one or more video cameras, randomly reversing the subsampled sequence of video frames to define a plurality of sub-sequences of randomly reversed video frames, training, in a training mode, a video reasoning model with temporally augmented input, including the plurality of sub-sequences of randomly reversed video frames, to make predictions over temporally augmented target classes, updating parameters of the video reasoning model by a machine leaning algorithm, and deploying, in an inference mode, the video reasoning model in the video reasoning system to make a final prediction related to a human action in the sequence of video frames.

A system for augmenting video sequences in a video reasoning system is presented. The system includes a memory and one or more processors in communication with the memory configured to randomly subsample a sequence of video frames captured from one or more video cameras, randomly reverse the subsampled sequence of video frames to define a plurality of sub-sequences of randomly reversed video frames, train, in a training mode, a video reasoning model with temporally augmented input, including the plurality of sub-sequences of randomly reversed video frames, to make predictions over temporally augmented target classes, update parameters of the video reasoning model by a machine leaning algorithm, and deploy, in an inference mode, the video reasoning model in the video reasoning system to make a final prediction related to a human action in the sequence of video frames.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
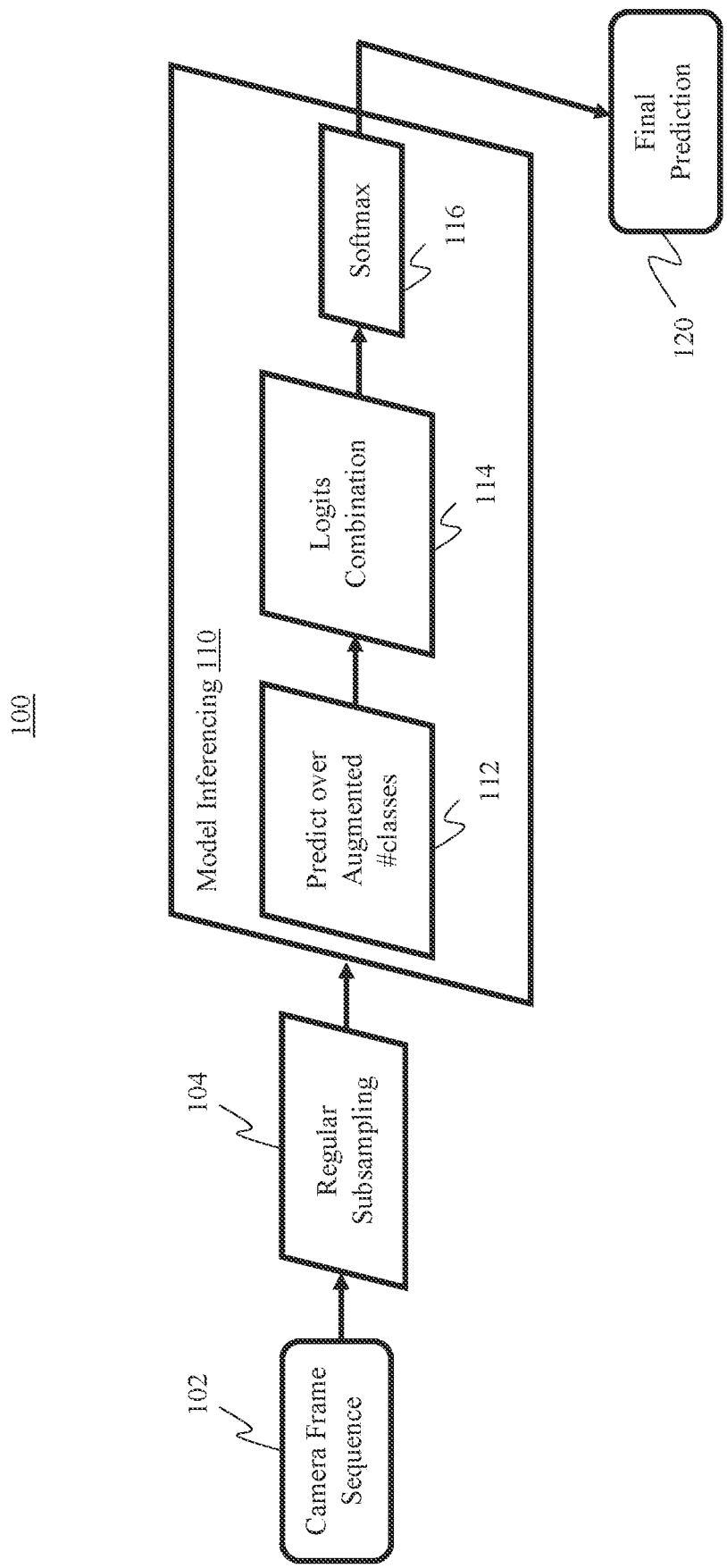
FIG. 1 is a block/flow diagram of an exemplary video reasoning system (inference mode), in accordance with embodiments of the present invention.

A deep learning model generally works well when it has a very large amount of data. In general, the more data, the better the performance of the model will be. Thus, as the amount of data increases, the performance of the deep learning model also improves. However, acquiring a massive amount of data comes with its own challenges. It is not possible, in every instance, to have a large amount of data to feed the deep learning network. The problem with the lack of a large amount of data is that the deep learning model might not learn the patterns or the functions from the data and hence the deep learning model may not perform well.

Instead of spending time manually collecting more data, image augmentation techniques can be used. Image augmentation is a technique of altering the existing data to create more data for the model training process. In other words, it is the process of artificially expanding the available dataset for training a deep learning model. This increases the training sample without going out and collecting this data. Note that, the label for all the images will be the same, that is, of the original image, which is used to generate them.

Conventional image augmentation techniques include, image rotation, image shifting, image flipping, image scaling, image noising, and image blurring. The alterations might further include flipping the image horizontally, vertically, padding, cropping, rotating, scaling and few other translations of the input image. For machine learning and deep learning models, collecting and labelling data can be exhausting and costly. Transformations in datasets by using data augmentation techniques allow companies to reduce these extra and unwanted operational costs.

Video understanding involves making an inference on a sequence of video frames. One of the fundamental visual reasoning tasks is action recognition that aims to classify a human action in a video sequence. However, due to high similarity between frames close in time, it is not trivial for a classifier to learn the subtle temporal difference in the representations between videos with similar actors and objects. The resulting model tends to suffer from overfitting and may not generalize well in practice. Therefore, the present exemplary invention seeks to augment video sequences in time to train the model at a lower test time loss, thus resulting in better generalization. While a longer training time is expected, there is almost no additional inference time overhead introduced, making it desirable for practical computer vision applications.

The exemplary video augmentation technique of the present exemplary invention randomly subsamples and reverses a training sequence of video frames for the model to perform classification among a doubled number of class categories. This forces the model to focus on the temporal order of the frames instead of relying too much on salient features in space and visual bias in the background because even if the visual features are prominent enough to classify the original class, the temporal ordering after augmentation now determines the class that the model must learn to reduce the loss. On the contrary, conventional art tends to pursue more fine-grained feature extraction, attention at higher frame sampling rates and introduces undesirable performance overhead at runtime.

FIG. 1 is a block/flow diagram of an exemplary video reasoning system (inference mode), in accordance with embodiments of the present invention.

The video reasoning system 100 accepts a sequence of video frames 102 from one or more live camera sources at runtime and makes a prediction 112 in the inference mode 110 of a trained computer vision model assuming a video classification task, such as action recognition to classify a video sequence.

In particular, the camera frame sequence 102 goes through a regular subsampling module or component 104 (subsampler) to commence model inferencing 110. Model inferencing includes making predictions 112 in the inference mode 110 by combining the augmented classification logits 114 and taking the softmax 116 of the logits 114 of the original classes only to arrive at a final prediction 120.

Figure 2:
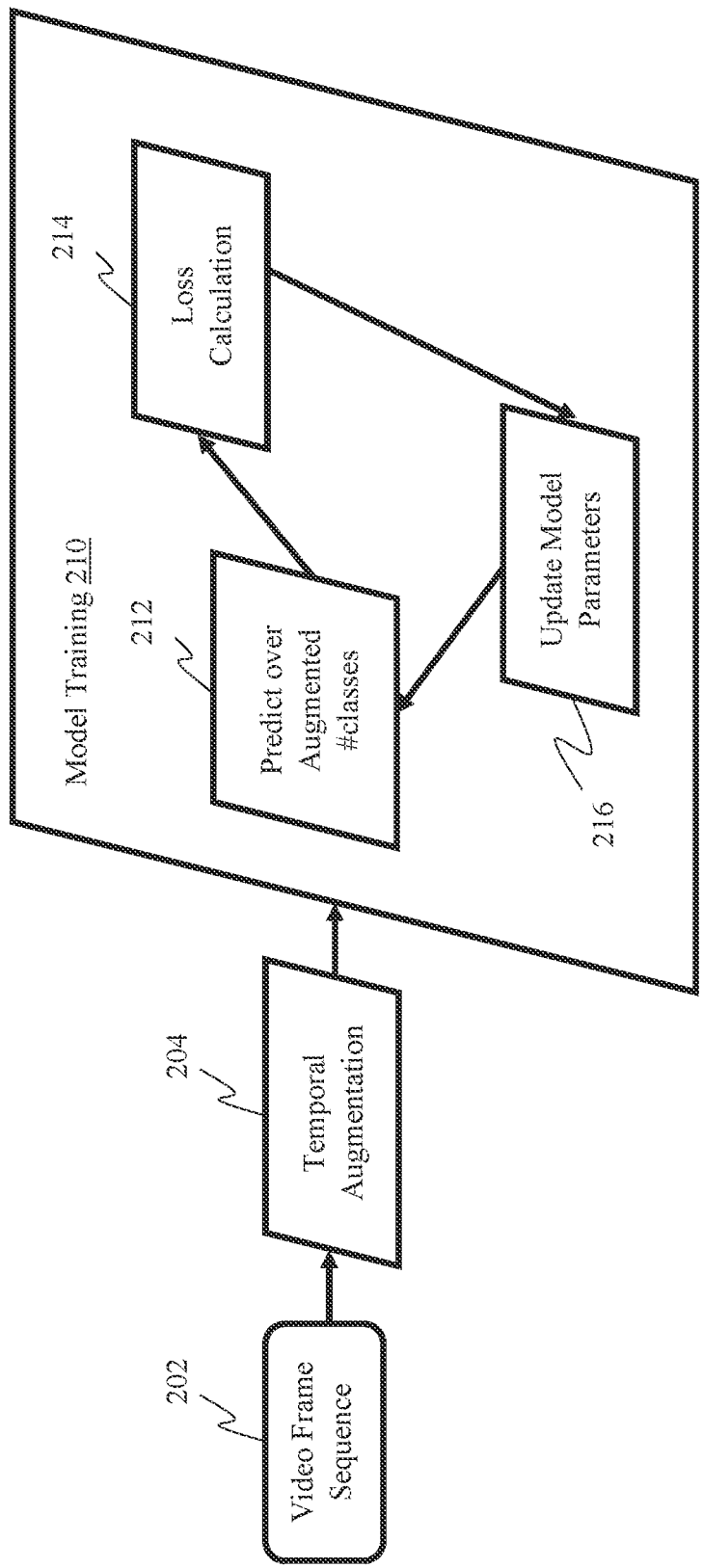
FIG. 2 is a block/flow diagram of an exemplary video reasoning system (training mode), in accordance with embodiments of the present invention.

FIG. 2 is a block/flow diagram of an exemplary video reasoning system (training mode), in accordance with embodiments of the present invention.

During a training mode 200, the temporal augmentation 204 proposed by the exemplary invention is applied to the input video frame sequence 202. If the augmentation involves reverse in time, the target class to predict 212 is offset by the total number of the original classes since a reverse video sequence is also unique for classification.

Model training 210 is implemented with temporally augmented input 204 to make predictions 212 over temporally augmented target classes. The model parameters are iteratively updated 216 by a common machine learning algorithm, such as the backpropagation, and the model also learns to reduce the loss via a loss calculation 214.

Figure 3:
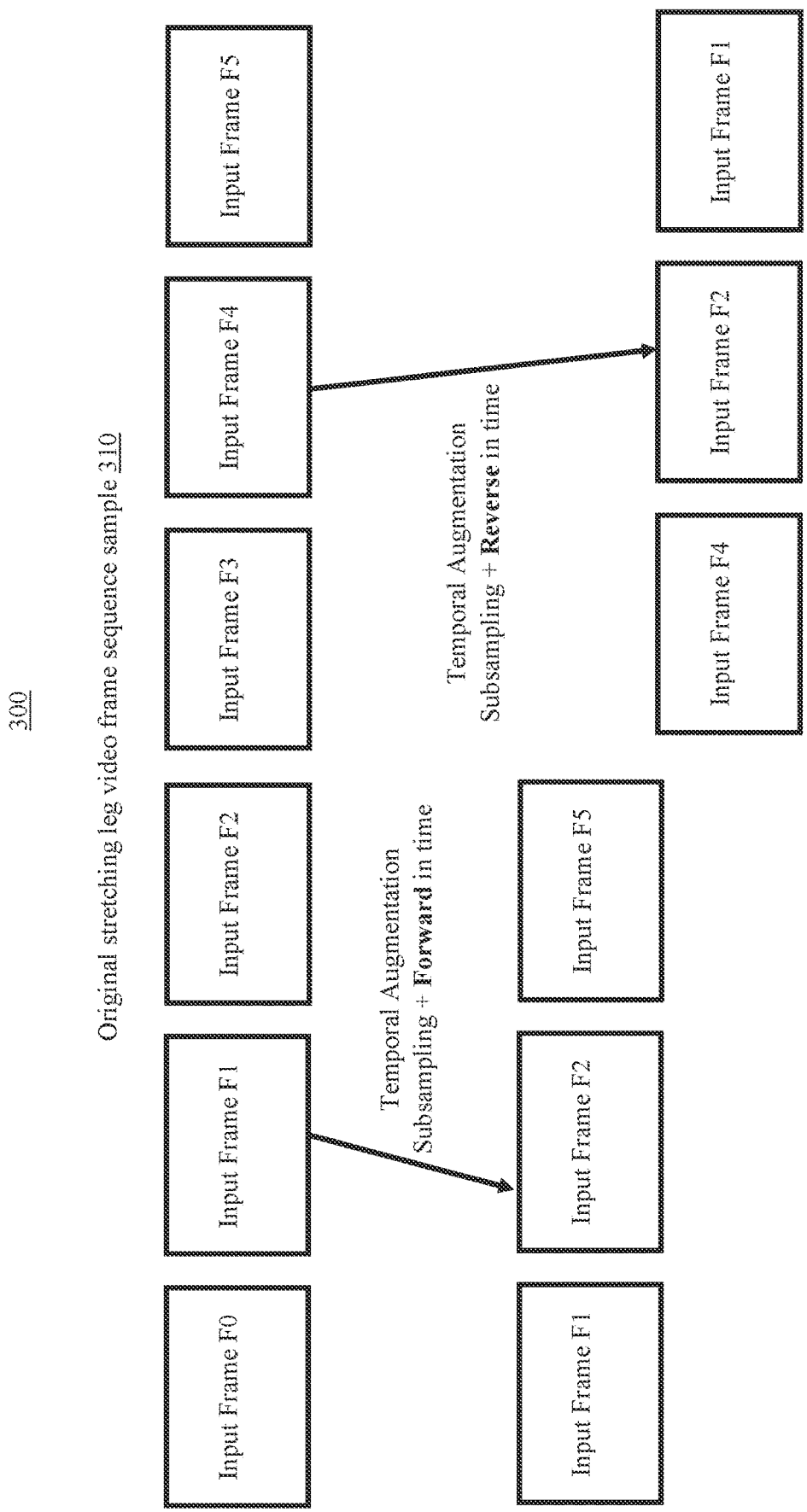
FIG. 3 is a block/flow diagram illustrating a temporal augmentation module, in accordance with embodiments of the present invention.

FIG. 3 is a block/flow diagram 300 illustrating a temporal augmentation module, in accordance with embodiments of the present invention.

The temporal augmentation process augments a sample input frame sequence from F0 to F5 for training the model. In particular, the sampled video sequence 310 includes 6 frames. That is, frames F0, F1, F2, F3, F4, F5. The sampled video sequence 310 can be, e.g., a video showing a person stretching his/her legs. In one instance, temporal augmentation can be employed to create or generate a sub-sequence of frames (F1, F2, F5) where the frames are assembled in a "forward in time manner." However, in another instance, temporal augmentation can be employed to create or generate a sub-sequence of frames (F4, F2, F1) where the frames are assembled in a "reverse in time manner." Such smaller sub-sequences of reversed frames can be used in the training dataset to train the video reasoning model. Therefore, a plurality of sub-sequences of reverse frames can be employed to train the video reasoning model.

In another instance, a video clip captured from a video camera can include, e.g., 10 frames depicting a subject skiing. The temporal augmentation can be employed to create or generate multiple sub-sequences of frames in reverse order. That is, sequence 1 can be (F8, F7, F4, F1), sequence 2 can be (F9, F7, F3, F1), sequence 3 can be (F9, F2, F1), and sequence 4 can be (F10, F5, F2, F1). Thus, multiple reverse sub-sequences (being lesser than the total number of frames, that is 10 frames) can be generated. In this instance, 4 sub-sequences or lesser sequences in reverse order were generated for training the video reasoning model. Depending on the length of the captured video clip any number of reverse order sub-sequences can be generated and used in training.

Therefore, according to FIGS. 1-3, the exemplary invention involves a temporal augmentation module or component that augments the video input temporally to train a video reasoning model. The trained model makes predictions in the inference mode by combining the augmented classification logits.

The workflow first includes temporal augmentation.

For temporal augmentation, the input video frame sequence 102 is first randomly subsampled 104 up to the maximum number of frames the video reasoning model can accept. Next, the subsampled sequence is randomly reversed. If revered, the target class is offset by the total number of original classes. For example, if the total number of classes is C, the target class t after reverse augmented becomes t+C. This is in view of the reversed frame sequence, which also uniquely classifies a different class from the original classes.

The workflow then includes training with temporal augmentation.

For the training 210, before the model is deployed in a video reasoning system for inferences, the model is trained with temporally augmented input 204 to make predictions 212 over temporally augmented target classes. The model parameters are iteratively updated 216 by a common machine learning algorithm, such as, but not limited to, backpropagation.

The workflow finally includes inference with augmented predictions.

For inference 110, once the reasoning model is trained with temporal augmentation, it is deployed in a video reasoning system that may accept a live video frame sequence as input. The input can be regularly subsampled up to a maximum number of frames depending on the model capacity. The model then makes a prediction over the augmented number of classes. Since those augmented number of classes other than the original do not exist in reality, the final prediction can be either discarded if the top one does not belong to any of the original classes, taking the softmax 116 of the logits 114 of the original classes only, or combining the logits 114 of the original and the corresponding augmented classes for the softmax value 116. The additional inference overhead should be marginal even with hundreds to thousands of classes. Moreover, the exemplary invention is not limited to the three strategies to make the final prediction 120 based on the temporally augmented model.

Figure 4:
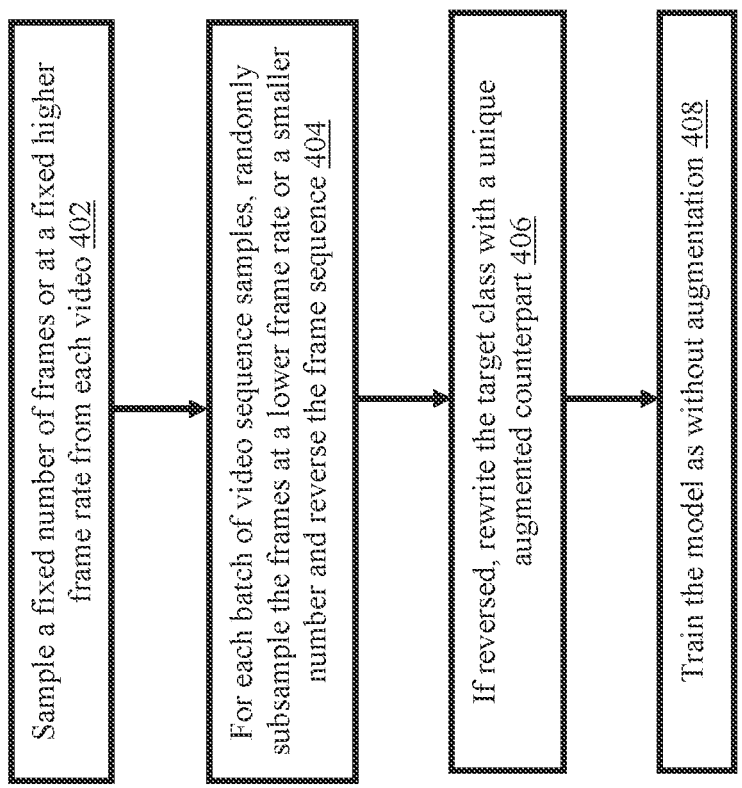
FIG. 4 is a block/flow diagram illustrating temporally augmented training, in accordance with embodiments of the present invention.

FIG. 4 is a block/flow diagram illustrating temporally augmented training, in accordance with embodiments of the present invention.

The temporally augmented video inference system for a reasoning task, such as action recognition, includes temporally augmented training.

The temporally augmented training includes:

At block 402, sampling a fixed number of frames or at a fixed higher frame rate from each video.

At block 404, for each batch of video sequence samples, randomly subsampling the frames at a lower frame rate or a smaller number and reverse the frame sequence.

At block 406, if reversed, rewriting the target class with a unique augmented counterpart.

At block 408, training the model as without augmentation.

Strategies to boost temporally augmented inference at nearly zero overhead include, e.g., only using predictions within the original number of classes. Otherwise, the predictions can be discarded. Additional strategies include, e.g., only considering logits within the original number of classes to count towards predictions and combining logits of the original and corresponding augmented classes to make predictions in the same original number of classes.

In conclusion, the inventive features include temporal augmentation combing subsampling and reverse in time, requiring no additional annotations applied during training, overfitting suppression, and introducing nearly zero inference overhead.

For temporal augmentation, combing subsampling and reverse in time, the augmentation is as straightforward as common image augmentation independent of datasets. For overfitting suppression, the model cannot just rely on visual features but must learn from temporal ordering for classification. For nearly zero inference overhead, even though the classifier layer needs to be expanded to classify double the number of classes, the overhead introduced is marginal in practice.

In summary, by combining all of the above novel features, the exemplary embodiments complement existing video understanding task training by offering general temporal augmentation and improve the generalization of reasoning models at nearly no additional inference cost.

Figure 5:
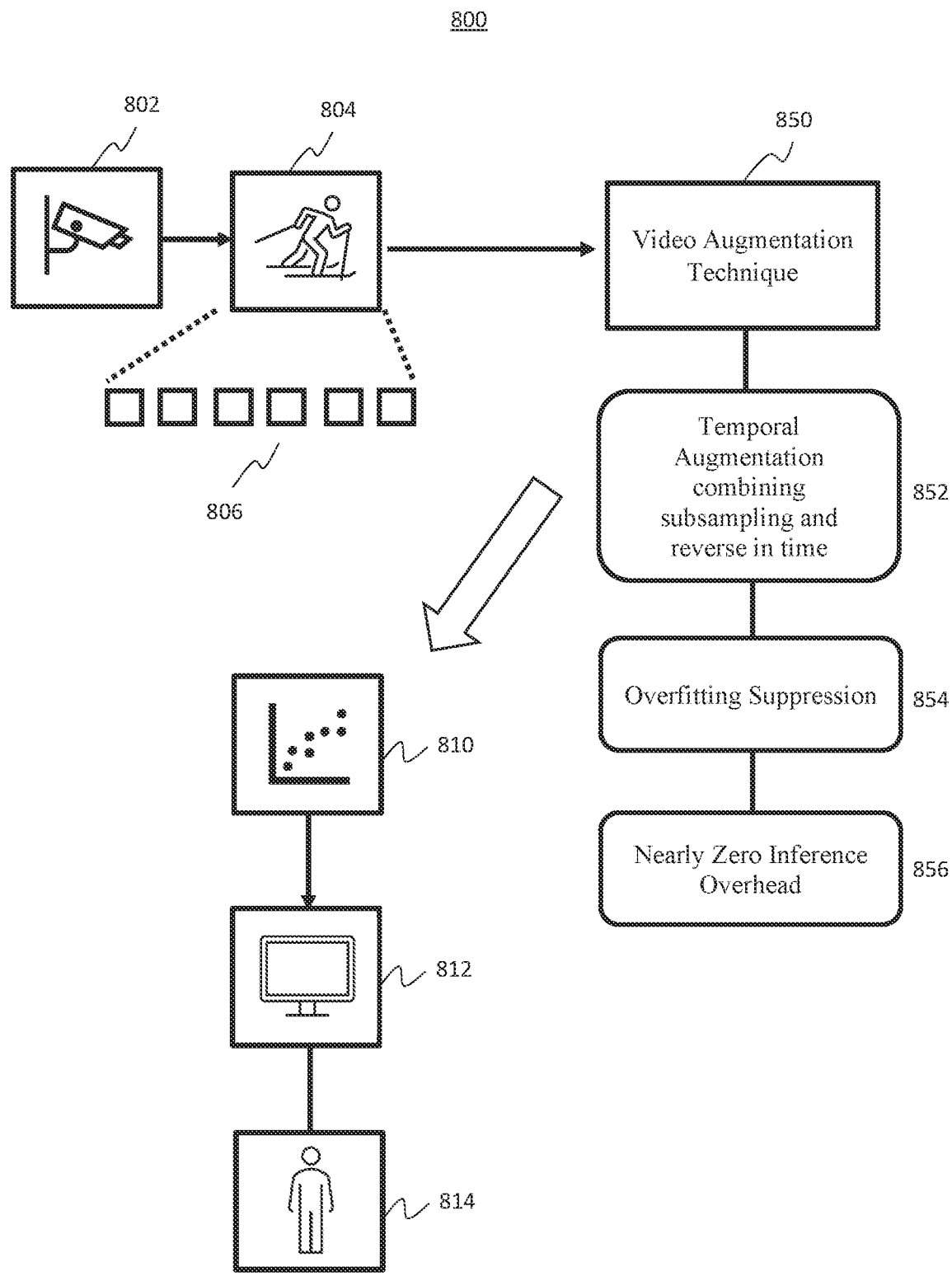
FIG. 5 is an exemplary practical application for augmenting video sequences, in accordance with embodiments of the present invention.

FIG. 5 is a block/flow diagram 800 of a practical application for augmenting video sequences, in accordance with embodiments of the present invention.

In one practical example, a camera 802 detects an object, such as a skier 804. A sequence of input frames 806 is obtained of the skier 804. The sequence 806 of the object 804 is processed by the video augmentation technique 850 by employing temporal augmentation combining subsampling and reverse in time 852, overfitting suppression 854, and nearly zero inference overhead 856. The results 810 (e.g., variables or parameters or factors or sub-sequence of reversed input frames) can be provided or displayed on a user interface 812 handled by a user 814.

Figure 6:
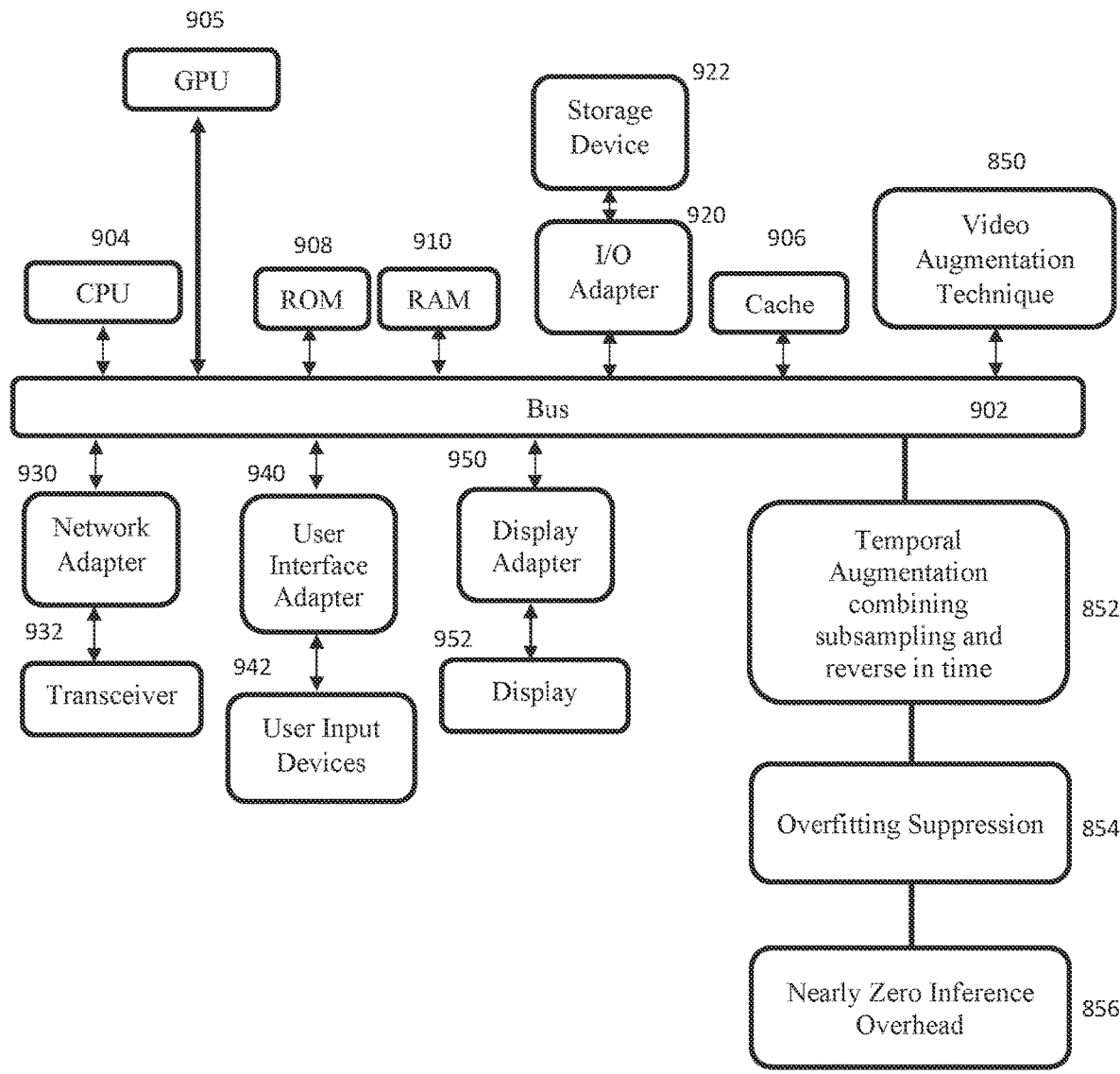
FIG. 6 is an exemplary processing system for augmenting video sequences, in accordance with embodiments of the present invention.

FIG. 6 is an exemplary processing system for augmenting video sequences, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the video augmentation technique 850 can be employed by temporal augmentation combining subsampling and reverse in time 852, overfitting suppression 854, and nearly zero inference overhead 856.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
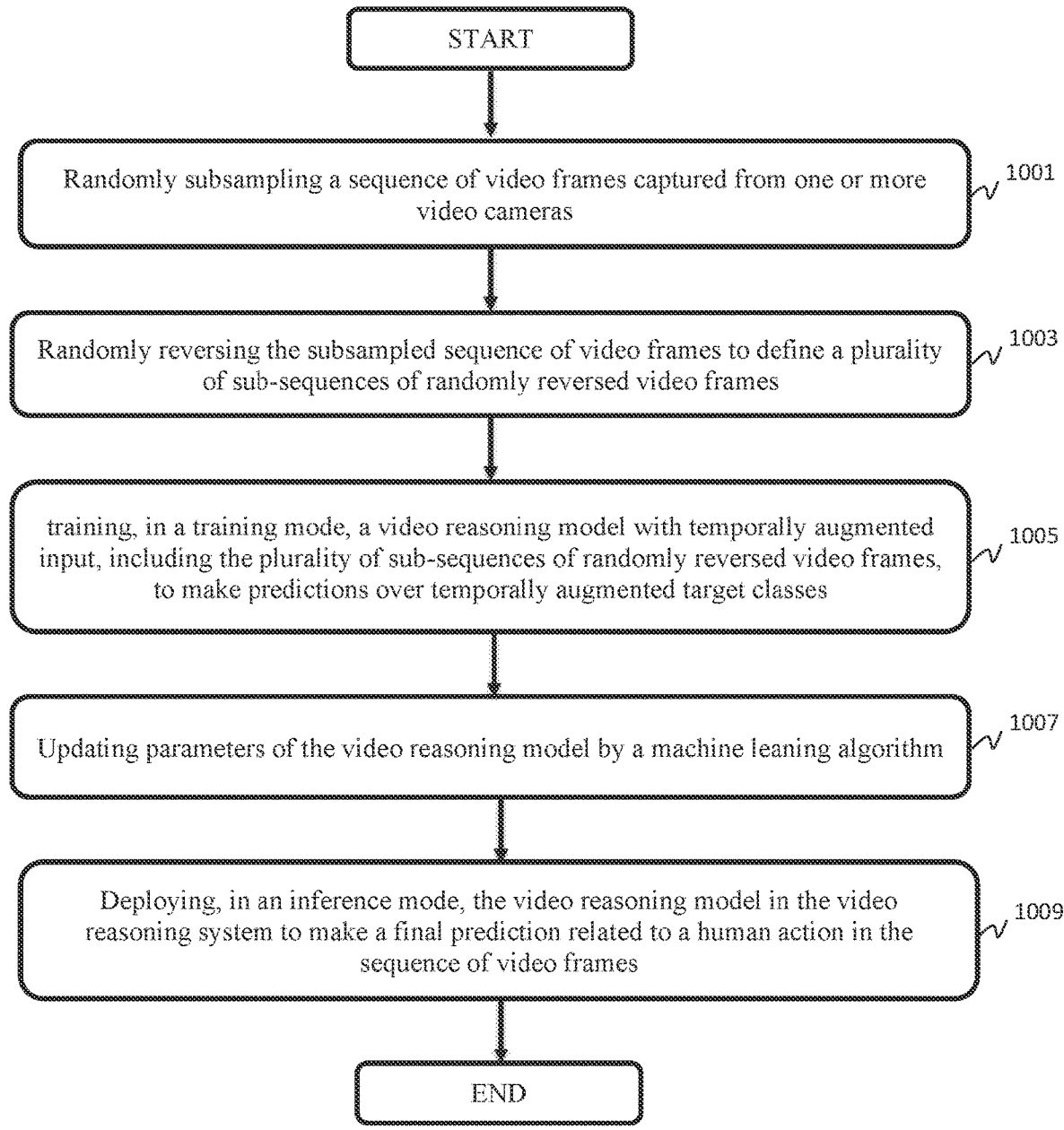
FIG. 7 is a block/flow diagram of an exemplary method for augmenting video sequences, in accordance with embodiments of the present invention.

FIG. 7 is a block/flow diagram of an exemplary method for augmenting video sequences, in accordance with embodiments of the present invention.

At block 1001, randomly subsampling a sequence of video frames captured from one or more video cameras.

At block 1003, randomly reversing the subsampled sequence of video frames to define a plurality of sub-sequences of randomly reversed video frames.

At block 1005, training, in a training mode, a video reasoning model with temporally augmented input, including the plurality of sub-sequences of randomly reversed video frames, to make predictions over temporally augmented target classes.

At block 1007, updating parameters of the video reasoning model by a machine leaning algorithm.

At block 1009, deploying, in an inference mode, the video reasoning model in the video reasoning system to make a final prediction related to a human action in the sequence of video frames.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for augmenting video sequences in a video reasoning system, the method comprising:
    randomly subsampling a sequence of video frames captured from one or more video cameras;
    randomly reversing the subsampled sequence of video frames to define a plurality of sub-sequences of randomly reversed video frames;
    training, in a training mode, a video reasoning model with temporally augmented input, including the plurality of sub-sequences of randomly reversed video frames, to make predictions over temporally augmented target classes;
    updating parameters of the video reasoning model by a machine learning algorithm by discarding a final prediction to retain the temporally augmented target classes with corresponding original classes; and
    deploying, in an inference mode, the video reasoning model, with overfitting suppression through a learned temporal order of video frames to determine the original classes, in the video reasoning system to make the final prediction related to classify a human action in the sequence of video frames.

2. The method of claim 1, wherein a target class is offset by a total number of original classes when the subsampled sequence of video frames is randomly reversed.

3. The method of claim 1, wherein the reversing of the subsampled sequence of video frames is implemented to classify a doubled number of class categories.

4. The method of claim 1, wherein the video reasoning model learns from temporal ordering for classification.

5. The method of claim 1, wherein taking a softmax of logits of original classes only is employed to arrive at the final prediction.

6. The method of claim 1, wherein combining logits of original classes and corresponding augmented classes for a softmax value is employed to arrive at the final prediction.

7. The method of claim 1, wherein the final prediction is discarded if a top class does not belong to any original classes.

8. A non-transitory computer-readable storage medium comprising a computer-readable program for explaining sensor time series data in natural language, wherein the computer-readable program when executed on a computer causes the computer to perform the steps of:
    randomly subsampling a sequence of video frames captured from one or more video cameras;
    randomly reversing the subsampled sequence of video frames to define a plurality of sub-sequences of randomly reversed video frames;
    training, in a training mode, a video reasoning model with temporally augmented input, including the plurality of sub-sequences of randomly reversed video frames, to make predictions over temporally augmented target classes;
    updating parameters of the video reasoning model by a machine learning algorithm by discarding a final prediction to retain the temporally augmented target classes with corresponding original classes; and
    deploying, in an inference mode, the video reasoning model, with overfitting suppression through a learned temporal order of video frames to determine the original classes, in a video reasoning system to make the final prediction related to classify a human action in the sequence of video frames.

9. The non-transitory computer-readable storage medium of claim 8, wherein a target class is offset by a total number of original classes when the subsampled sequence of video frames is randomly reversed.

10. The non-transitory computer-readable storage medium of claim 8, wherein the reversing of the subsampled sequence of video frames is implemented to classify a doubled number of class categories.

11. The non-transitory computer-readable storage medium of claim 8, wherein the video reasoning model learns from temporal ordering for classification.

12. The non-transitory computer-readable storage medium of claim 8, wherein taking a softmax of logits of original classes only is employed to arrive at the final prediction.

13. The non-transitory computer-readable storage medium of claim 8, wherein combining logits of original classes and corresponding augmented classes for a softmax value is employed to arrive at the final prediction.

14. The non-transitory computer-readable storage medium of claim 8, wherein the final prediction is discarded if a top class does not belong to any original classes.

15. A system for explaining sensor time series data in natural language, the system comprising:
    a memory; and
    one or more processors in communication with the memory configured to:
        randomly subsample a sequence of video frames captured from one or more video cameras;
        randomly reverse the subsampled sequence of video frames to define a plurality of sub-sequences of randomly reversed video frames;
        train, in a training mode, a video reasoning model with temporally augmented input, including the plurality of sub-sequences of randomly reversed video frames, to make predictions over temporally augmented target classes;

update parameters of the video reasoning model by a machine learning algorithm by discarding a final prediction to retain the temporally augmented target classes with corresponding original classes; and deploy, in an inference mode, the video reasoning model, with overfitting suppression through a learned temporal order of video frames to determine the original classes, in the video reasoning system to make the final prediction related to classify a human action in the sequence of video frames.

16. The system of claim 15, wherein a target class is offset by a total number of original classes when the subsampled sequence of video frames is randomly reversed.

17. The system of claim 15, wherein the reversing of the subsampled sequence of video frames is implemented to classify a doubled number of class categories.

18. The system of claim 15, wherein the video reasoning model learns from temporal ordering for classification.

19. The system of claim 15, wherein taking a softmax of logits of original classes only is employed to arrive at the final prediction.

20. The system of claim 15, wherein combining logits of original classes and corresponding augmented classes for a softmax value is employed to arrive at the final prediction.

* * * * *